UNITED STATES PATENT OFFICE.

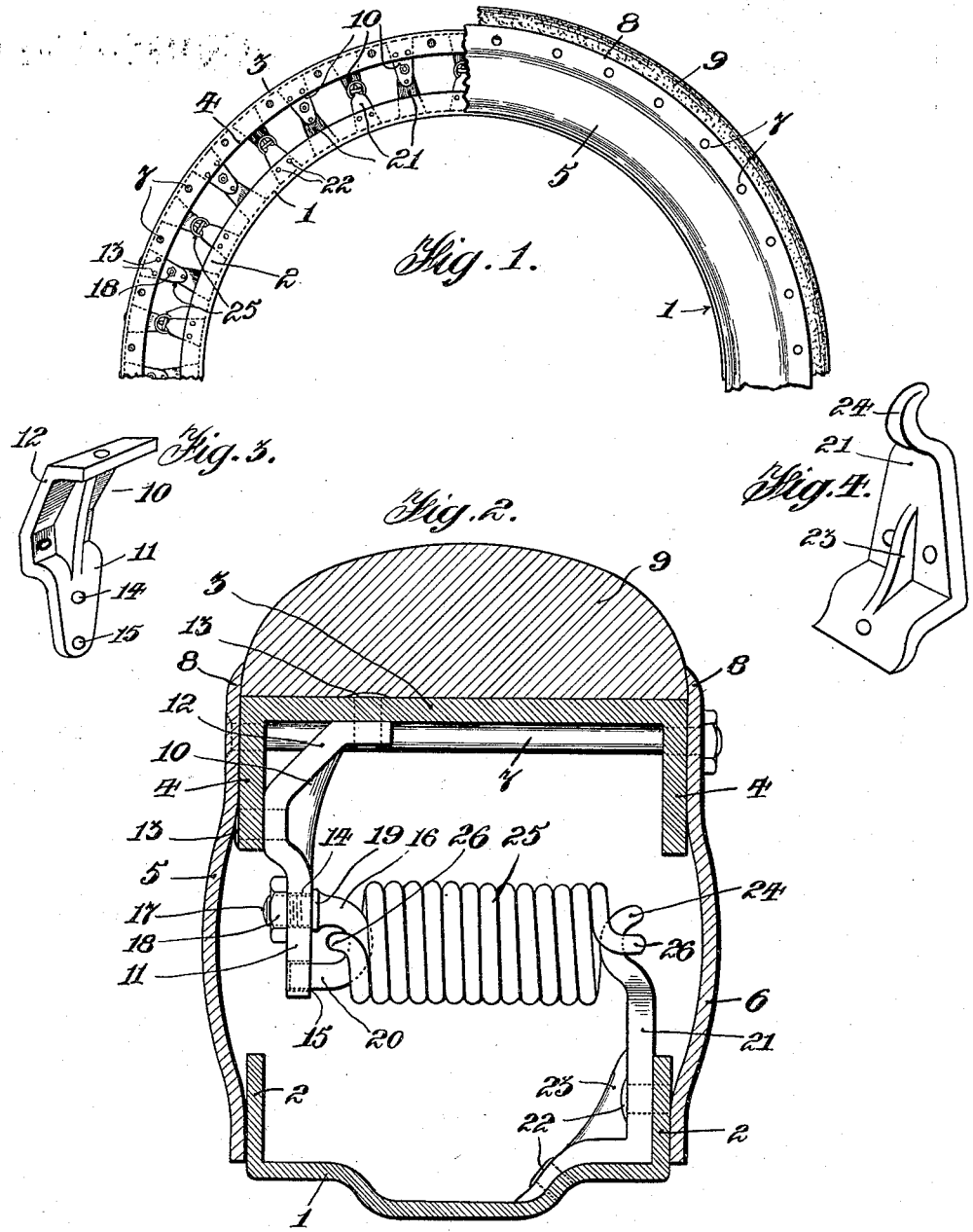

PIERRE ANTONIO PAINCHAUD, OF PLESSISVILLE, QUEBEC, CANADA, ASSIGNOR TO JOHN PARADIS AND OCTAVE GINGRAS, BOTH OF QUEBEC, CANADA.

QUICK-DETACHABLE ELASTIC TIRE.

1,149,780.  Specification of Letters Patent.  Patented Aug. 10, 1915.

Application filed December 5, 1914.  Serial No. 875,728.  REISSUED.

*To all whom it may concern:*

Be it known that I, PIERRE ANTONIO PAINCHAUD, a subject of the King of Great Britain, and resident of Plessisville, in the Province of Quebec, Canada, have invented certain new and useful Improvements in Quick-Detachable Elastic Tires; and I do hereby declare that the following is a full, clear, and exact description of the same.

The invention is a "quick detachable elastic tire" and the object of the invention is to provide an elastic tire that may be made in standard sizes to be mounted on fellies of ordinary wheels.

A further object of the invention is to provide a tire of this character with a minimum depth consistent with the requisite strength and springiness, in order that the resulting wheel shall have just about the same appearance as an ordinary pneumatic tired wheel.

A still further object is to simplify and thus cheapen the cost of the tire.

The invention consists of a pair of opposing U-sectioned metal bands forming inner and outer rims concentrically arranged and between which the springs to give the necessary resilience, are arranged in a particular manner. The inner rim or band is made of such a size that it will nicely fit the felly of a standard size wheel and is secured thereon by any suitable means. The outer band preferably carries a rubber tread portion and side plates to close in the space between the two rims. The provision of the two U-sectioned bands, not only lessens the depth of the tire, but provides advantageous supports for a plurality of brackets secured in pairs to the inner and outer rims respectively on opposite sides of the wheel, between which the springs are stretched so as to lie in a direction parallel with the axis of the wheel, these springs engaging hooks on the free ends of the brackets so that they may be easily attached or detached.

The invention will be better understood with the aid of the accompanying drawings in which—

Figure 1 is a side view of a portion of the elastic tire according to the present invention, partly in elevation and partly with one of the side plates removed to disclose the interior of the tire. Fig. 2 is a cross section through the tire and a pair of the spring-supporting brackets. Fig. 3 is a perspective view of one of the spring-supporting brackets and Fig. 4 is a similar view of another of the supporting brackets.

Referring to the drawings, 1 indicates the inner rim having the outwardly extending side flanges 2 and of such size as to nicely fit the felly of an ordinary standard size wheel, said rim being secured to the felly (not shown) by any known means, such, for instance, as the well known wedges which would enable the rim to be taken off the wheel very quickly.

3 is the outer rim of larger diameter, but preferably about the same width and having the inwardly extending continuous side flanges 4. It will thus be seen that the rims 1 and 3 are U-shaped in cross section at any point therearound and consequently are very easily and cheaply produced. It should be mentioned that the flanges 2 and 4 extend toward each other only a sufficient distance to allow of a fair amount of movement of one rim in relation to the other in the plane of the wheel, and the space between the two rims is covered in by opposite side plates 5 and 6 carried by the outer rim 3 and having sliding abutment with the flanges 2.

The side plates 5 and 6 are rigidly secured to the rim 3, against the flanges 4 thereof, through the medium of cross bolts 7 extending through the flanges of the said rim 3 from side to side. These side plates 5 and 6 each extend a little beyond the rim 3 as indicated by the numeral 8 in order to provide a channel within which is disposed a rubber tread 9.

10 are spring-supporting brackets arranged, in the angles formed by the flanges 4 and the rim 3, at intervals therearound and staggered from side to side, that is to say, each bracket on one side of the rim comes between two brackets on the other side. In Fig. 2, one of such brackets 10 appears on one side of the rim, but it will be understood from the foregoing description that such brackets are arranged on both sides of the rim in alternate arrangement and in the angles formed by the flanges 4. These brackets 10 are each formed with a depending tongue 11 and a base portion 12 secured to the rim 3 and flange 4 by the rivets 13, and that portion of the base extending between the rim and flange is preferably arranged diagonally as shown in order to provide a strut giving additional strength to the rim.

Each of the tongues 11 is provided with a pair of holes 14 and 15 engaged by a hook 16. This hook has a threaded shank portion 17 extending through the hole 14 and provided with a tightening nut 18, while the head portion of the hook is provided with a shoulder 19 and looped around therefrom until its free end 20 engages the hole 15. It should be mentioned that the hooks 16 in the normal position of the wheel lie approximately midway between the rims 1 and 3.

21 are brackets secured to the rim 1 in the angles formed by the flanges 2, these brackets being arranged on both sides of the rim in alternate arrangement so that each bracket 21 on one side of the rim comes opposite one of the brackets 10 on the other side of the rim 3. The brackets 21 are each secured to the flange 2 and the rim by rivets 22 and are further strengthened across the angle by the provision of a web or strut 23, and, outward of the flange, each of the said brackets 21 is extended to a point approximately midway between the two rims to form a tongue terminating in the integral hook 24.

Now, it will be seen that every hook 16 comes horizontally opposite one of the hooks 24 and between each of these pairs of said hooks, a coiled spring 25 is stretched, the looped ends 26 of said spring engaging the hooks as clearly seen in Fig. 2. Thus, there are a series of springs extending transversely of the tire at intervals therearound and intermediate between the rims 1 and 3. It will now be seen that the rim 1 is free to move toward or away from the rim 3 at any point against the resistance of the springs 25 which, being moved laterally, stretch, thus giving the necessary resilience to the wheel. During the movement of the rim 1 in relation to the rim 3, the plates 5 and 6 move with the rim 3 and slide alongside the flanges 2, which latter assist in guiding the plates in their movement and in forming such rigid support as is required when the wheel skids or slides as a whole laterally.

It will be noticed that the hooks 24 are rigid while the hooks 16 are adjustable and this is a feature which greatly helps in the assembling of the tire, particularly as each spring is slightly stretched in the fixed position. After hooking the spring on the rigid hook, the adjustable hook can be moved in a longitudinal direction to stretch the spring by simply tightening up the nut 17.

Attention is called to the fact that the tire according to the invention can be very quickly applied to the felly of an ordinary automobile or other wheel, and further that in the tire according to the invention, special attention has been given to the details of construction in order to provide great strength to contend with skidding movements of the wheel. Furthermore, with the springs arranged parallel with the axis of the wheel, it will be noticed that all the springs are stretched to a corresponding extent when relative movement takes place between the inner and outer rims and during this movement, the hooks 24 and 16 accommodate the swinging of the spring in any direction.

What I claim is:—

In a quick detachable elastic tire, an inner rim having outwardly extending continuous opposite side flanges, an outer rim surrounding and of larger diameter than the inner rim and having continuous inwardly extending opposite side flanges, a pair of side plates adapted to close the space between said outer and inner rims and having sliding abutment with the flanges of said inner rim, bolts securing said side plates against the flanges of the outer rim, said side plates extending a little beyond the outer rim, a tread member mounted on the periphery of said outer rim between said side plate extensions, inwardly extending brackets rigidly secured to said outer rim in the angles formed by its flanges, said brackets being on both sides of the rim and in alternate arrangement and each having a base extending diagonally across the angle and terminating in a tongue portion with a pair of holes therein, a hook having a threaded shank and engaging one of said holes and having a head portion bent over to engage the other hole, a nut on said shank for clamping the hook to the tongue, outwardly extending brackets rigidly secured to the inner rim in the angles formed by its flanges, and arranged on both sides of the inner rim in alternate arrangement and each terminating in a tongue bent to form an integral hook, and a coil spring stretched between each inner and outer rim bracket and having looped ends engaging the hooks of said brackets.

Signed at Plessisville, Quebec, Canada, this first day of December, 1914.

PIERRE ANTONIO PAINCHAUD.

Witnesses:
L. R. GUILBAULT,
J. L. GOMELIN.

Copies of this patent may be obtained for five cents each, by addressing the "Commissioner of Patents. Washington, D. C."